(12) United States Patent
Kim et al.

(10) Patent No.: US 7,346,189 B2
(45) Date of Patent: Mar. 18, 2008

(54) ILLUMINATION-INVARIANT OBJECT TRACKING METHOD AND IMAGE EDITING SYSTEM USING THE SAME

(75) Inventors: Tae-kyun Kim, Yongin (KR); In-myung Cho, Seongnam (KR); Jong-ha Lee, Yongin (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 0 days.

(21) Appl. No.: 11/514,968

(22) Filed: Sep. 5, 2006

(65) Prior Publication Data

US 2007/0003106 A1   Jan. 4, 2007

Related U.S. Application Data

(62) Division of application No. 10/287,592, filed on Nov. 5, 2002, now Pat. No. 7,171,023.

(30) Foreign Application Priority Data

Nov. 5, 2001   (KR)   .............................. 2001-68636

(51) Int. Cl.
*G06T 5/00* (2006.01)
(52) U.S. Cl. .................. 382/103; 382/162; 382/254
(58) Field of Classification Search ................ 382/103, 382/162, 164, 254, 260, 276, 286
See application file for complete search history.

(56) References Cited

U.S. PATENT DOCUMENTS

| | | | |
|---|---|---|---|
| 5,912,980 A | 6/1999 | Hunke | 382/103 |
| 6,539,099 B1 * | 3/2003 | Kellner | 382/103 |
| 6,917,692 B1 | 7/2005 | Murching et al. | 382/103 |
| 2002/0076087 A1 | 6/2002 | You et al. | 382/103 |
| 2002/0176001 A1 | 11/2002 | Trajkovic | 348/169 |

FOREIGN PATENT DOCUMENTS

KR   0170698 B1   10/1998

OTHER PUBLICATIONS

Brian V. Funt, "Color Constant Color Indexing", IEEE Transactions on Pattern Analysis and Machine Intelligence, 1995, vol. 17, No. 5, pp. 522-529 (cited in specification).

(Continued)

*Primary Examiner*—Andrew W. Johns
(74) *Attorney, Agent, or Firm*—Buchanan Ingersoll & Rooney PC

(57) ABSTRACT

An illumination-invariant object tracking method and an image editing system using the same are provided. The illumination-invariant object tracking method involves: designating an initial position of an object of interest to be tracked in an image; constructing a probability map for object tracking in consideration of a color ratio of adjacent pixels in the image; and performing Kalman filtering based on the initial position of the object and the probability map. The image editing system based on the illumination-invariant object tracking method includes: a data input unit which receives an image to be edited; an object tracking unit which tracks a target object in consideration of a color ratio of adjacent pixels in the image; an image editing unit which edits and outputs an edited image in a predetermined region of the image, in response to information on the position, size, and boundary of the tracked target object.

24 Claims, 12 Drawing Sheets

OTHER PUBLICATIONS

K. Schwerdt et al: "Robust Face Tracking Using Color", Automatic Face and Gesture Recognition 2000, Proceedings. Fourth IEEE International Conference on Grenoble, France, Mar. 28-30, 2000, pp. 90-95, IEEE.

Tae-Woong Yoo et al: "A Method for Real-Time Face Region Tracking Based on Color Histogram", Proceedings of the International Society for Optical Engineering, 1996, pp. 361-365, vol. 2739.

* cited by examiner (a)

(b)

(a)

(b)

(c)

(a)

(b)

(c)

ILLUMINATION-INVARIANT OBJECT TRACKING METHOD AND IMAGE EDITING SYSTEM USING THE SAME

CROSS-REFERENCE TO RELATED APPLICATIONS

This application is a divisional of Application S.N. 10/287,592, filed Nov. 5, 2002, now U.S. Pat. No. 7,171,023, which is based upon and claims priority from Korean Patent Application No. 2001-68636 filed Nov. 5, 2001, the contents of which are incorporated herein by reference.

BACKGROUND OF THE INVENTION

1. Field of the Invention

The present invention relates to an object tracking method, and more particularly, to an illumination-invariant object tracking method, and an image editing system using the method.

2. Description of the Related Art

The present trend toward the introduction of "multimedia" into almost all information provisions and flows has resulted in a variety of digital cameras, video conferencing cameras, video image processing systems for processing an image taken from a camera, and software therefor released in the market.

An image editing system for editing a moving picture taken by a camera has a variety of functions of processing an image of a specific person's face or product in a frame, for example, as a mosaic. Among the variety of functions of the image editing system, the mosaic processing function can be performed on the entire frame or a particular region of a frame. As disclosed in Korean Patent No. 10-170698 entitled "Real-time Image Mosaic System", having an applicant in common with the present invention, the mosaic processing function can be performed in real time based on the motion of an image of concern.

In general, most images are taken in inconstant illumination conditions by a camera. Specifically, when taking pictures outdoors, variable natural light intensities/or spectrums result in images whose brightness/or color is not uniform. In this case, if a mosaic process is performed irrespective of the intensity variation, due to brightness/or color-dependant variations in pixel values of the image, the mosaic process may be performed inaccurately. To solve this problem, a mosaic processing method using a tracking algorithm based on the shape information of an object was suggested. However, this method increases complexity, and thus needs a high-performing computing system and memory. Furthermore, the method cannot be applied to real-time processing.

SUMMARY OF THE INVENTION

Accordingly, it is an object of the present invention to provide an object tracking method capable of reliably tracking a desired region of an image regardless of illumination variations and an image editing system capable of editing an image in real time.

In one aspect, the present invention provides an illumination-invariant object tracking method comprising: (a) designating an initial position of an object of interest to be tracked in an image; (b) modeling color information on the image in consideration of a color ratio of adjacent pixels in the image; (c) constructing a probability map based on the result of the color modeling; and (d) tracking a current position of the target object in response to the initial position and the probability map.

In another aspect, the present invention provides an image editing method comprising: (a) receiving an image to be edited; (b) tracking an object of interest in consideration of a color ratio of adjacent pixels in the image; and (c) editing and outputting an edited image in a predetermined region of the image in response to information on the position, size, and boundary of the tracked object.

In another aspect, the present invention provides an object tracking system comprising: an initial position designating portion which designates an initial position of a target object to be tracked in an image; a color modelling portion which performs a color modelling on the target object and the entire image in consideration of a color ratio of adjacent pixels in the image; a probability map constructing portion which constructs a probability map for object tracking based on the result of the color modelling; and an object tracking portion which tracks a current position of the target object in response to the initial position and the probability map.

In another aspect, the present invention provides an image editing system comprising: a data input unit which receives an image to be edited; an object tracking unit which tracks a target object in consideration of a color ratio of adjacent pixels in the image; an image editing unit which edits and outputs an edited image in a predetermined region of the image, in response to information on the position, size, and boundary of the tracked target object.

BRIEF DESCRIPTION OF THE DRAWINGS

The above object and advantages of the present invention will become more apparent by describing in detail preferred embodiments thereof with reference to the attached drawings in which.

DETAILED DESCRIPTION OF THE INVENTION

Preferred embodiments of the present invention will be described in greater detail with reference to the appended drawings.

Figure 1:
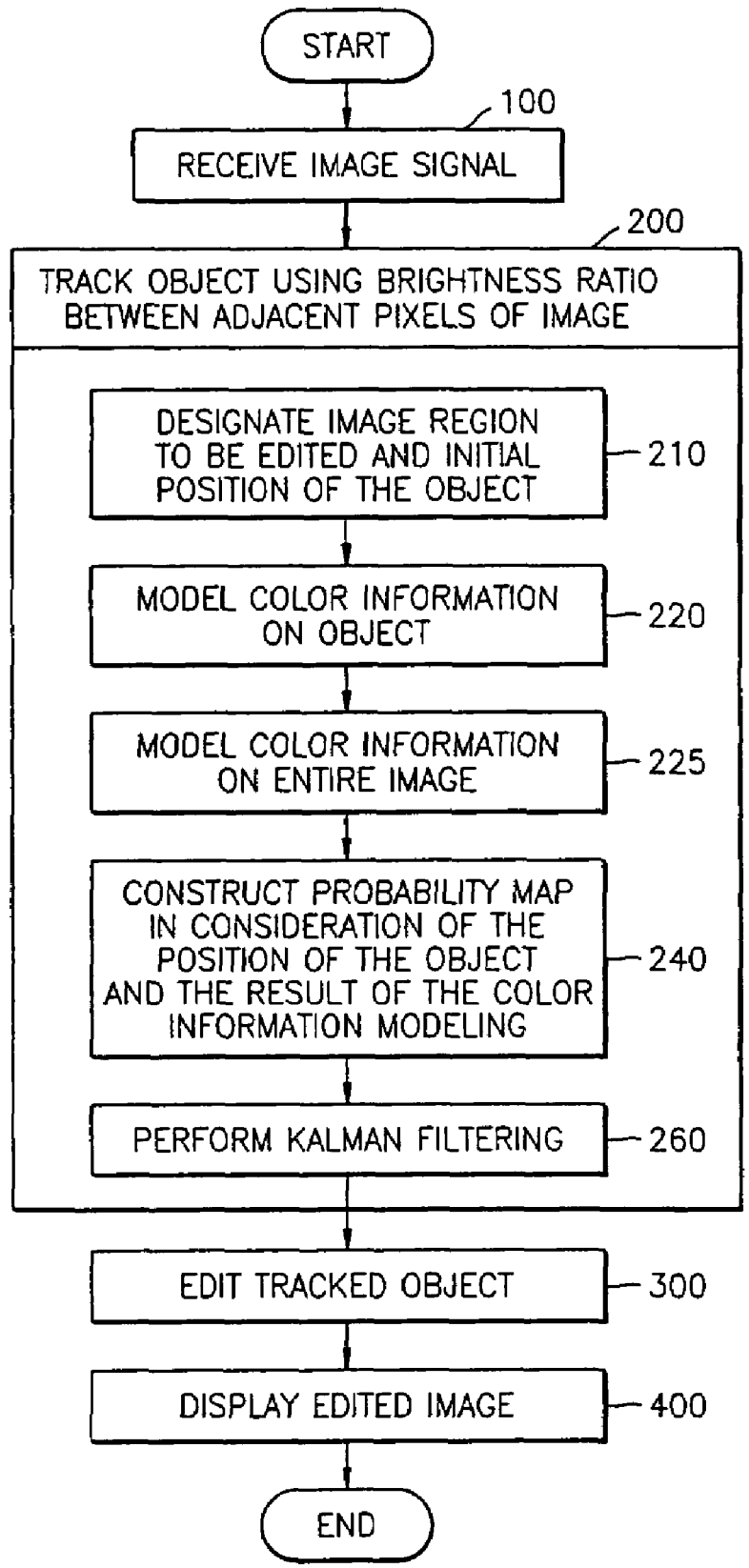
FIG. 1 is a flowchart of an illumination-invariant object tracking method and an image editing method based on the object tracking method according to an embodiment of the present invention.

FIG. 1 is a flowchart of an illumination-invariant object tracking method and an image editing method based on the object tracking method according to an embodiment of the present invention. Referring to FIG. 1, the image editing method according to the present invention involves receiving an image signal (step 100), tracking an object using a color ratio between adjacent pixels of the image (step 200), and editing and displaying the tracked object (steps 300 and 400).

Mostly, taking pictures using a camera is performed in varying brightness conditions. As a result, the resultant pictures frequently have non-uniform color, which causes an error in tracking an object to be edited. According to the present invention, the object tracking is performed using the color ratio between adjacent pixels of the image to eliminate the effect of the varying illumination.

In the image processing field, many approaches have been made to find out illumination-invariant characteristics. A color ratio between adjacent pixels is found to be invariant to spatially varying illumination in an article entitled "Color Constant Color Indexing" (Brain V. Funt and Graham D. Finlayson, IEEE Transactions on Pattern Analysis and Machine Intelligence, 1995). According to the disclosure in this article, since the color of adjacent pixels is dependent upon reflecting properties of the surface to which the pixels belong, the color ratio of the adjacent pixels is unaffected by entire or spatial illumination variations.

Figure 2:
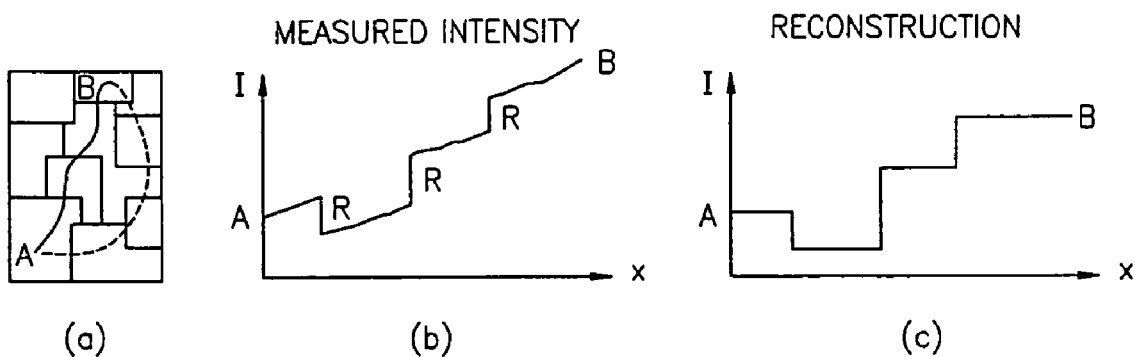
FIG. 2 shows variations in brightness ratio between adjacent pixels.

FIG. 2 shows variations in brightness ratio between adjacent pixels. In FIG. 2, adjacent pixels located in a path connecting points A and B of the image shown in (a) have intensities as shown in (b). The intensities are greatly affected by illumination variations. However, according to the article by Brain V. Funt and Graham D. Finlayson, the brightness/or color ratio between the adjacent pixels of the image remains unaffected by the illumination variations, as shown in (c).

According to the present invention, based on the above characteristics, illumination-invariant object tracking is performed as follows. In the object tracking method according to the present invention, an image region to be edited and an initial position of an object to be tracked are initially designated (step 210). Modelling of the color information of the object to be tracked and on the color information of the entire image is performed (steps 220 and 225). In consideration of the results of modelling the color information from step 220 and 225 and the designated position information of the object, a probability map is constructed (step 240). Kalman filtering is performed based on the constructed probability map and the initial position (step 260). A Kalman filter for an object motion prediction, which is described later, is widely used to track a moving object. The object tracking method according to the present invention will be described in greater detail step-by-step below.

Figure 3:
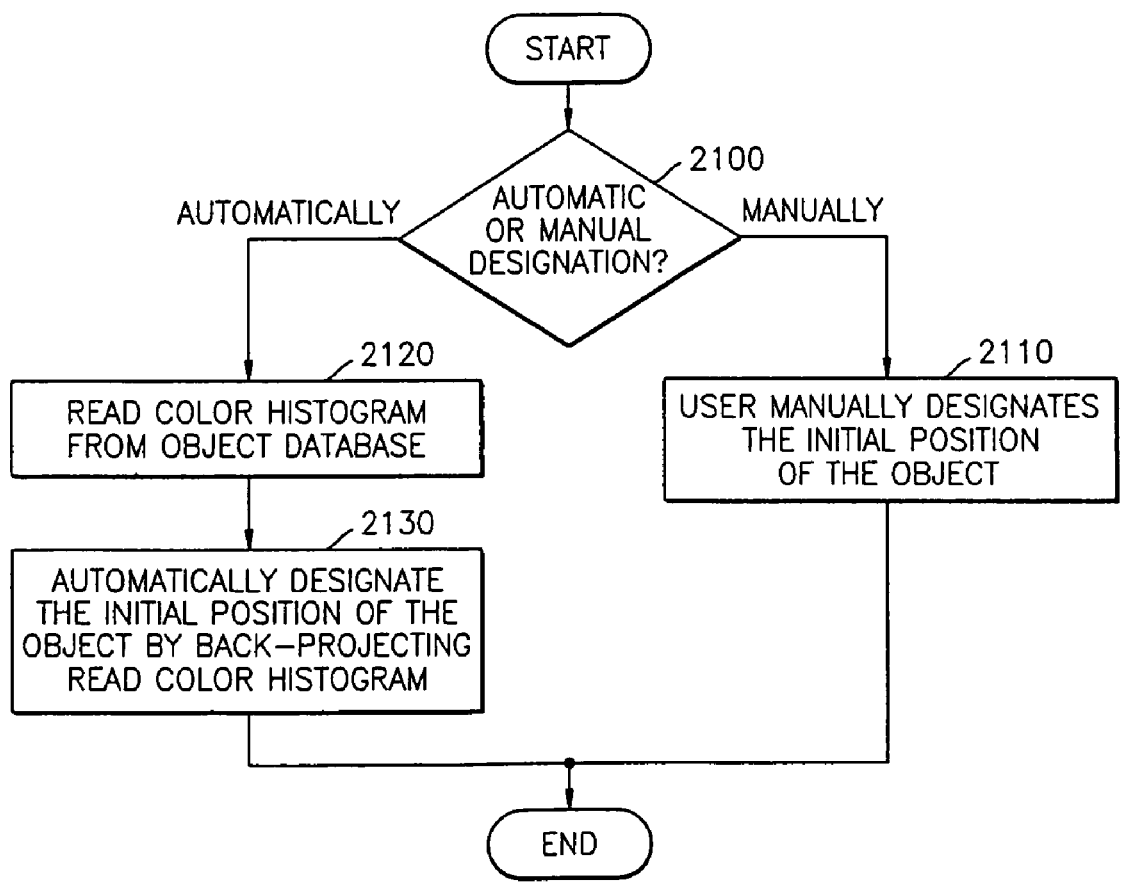
FIG. 3 is a flowchart of a step of designating an initial position of an object in FIG. 1.

FIG. 3 is a flowchart of the designation of the initial position of an object in step 210 of FIG. 1. Referring to FIG. 3, it is determined whether to automatically or manually designate the initial position of the object (step 2100). If it is determined in step 2110 to manually designate the initial position of the object, a user defines a boundary box enclosing the object on the image using a mouse (step 2110). If it is determined in step 2100 to automatically designate the initial position of the object, the user designates an object to be edited in an object database which is previously created and stored in a predetermined data region. Next, a color histogram of the object is read from the database (step 2120), and the initial position of the object is automatically designated by back-projection of the read color histogram (step 2130).

A back-projection algorithm applied to the color histogram, used in step 2130, is used to reduce an effect of background color that hinders recognition of the object in the image and to find out the position where the color of the target object is most apparent.

Figure 4:
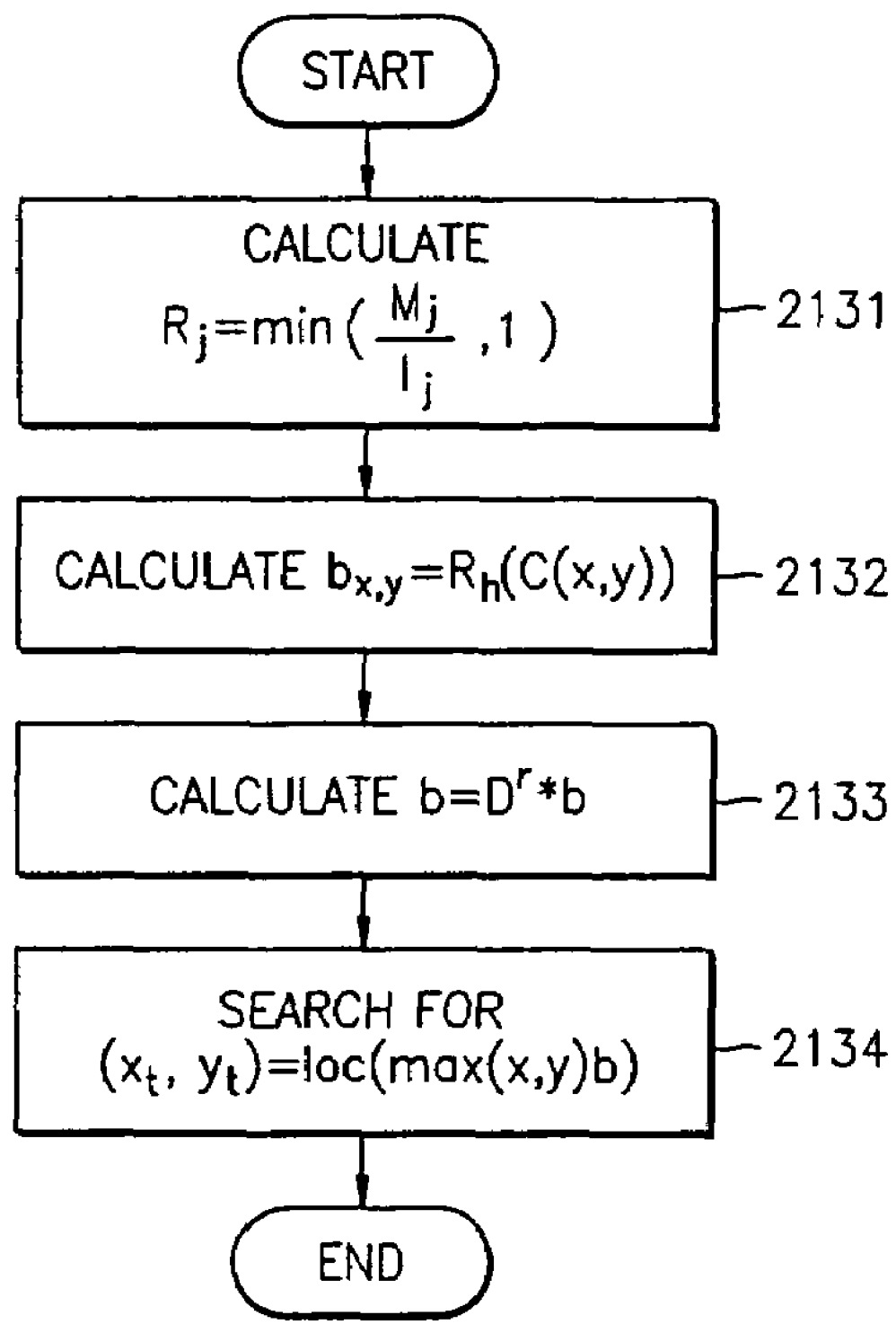
FIG. 4 is a flowchart of a back-projection step in FIG. 3.

FIG. 4 is a flowchart of the back-projection in step 2130 of FIG. 3. Referring to FIG. 4, in the back-projection of the color histogram, denoting a disk having a radius r as $D^r$, $$R_j = \min\left(\frac{M_j}{I_j}, 1\right)$$

is calculated for each histogram bin j (step 2131), where $M_j$ denotes the color histogram of a previous model for the histogram bin j, and $I_j$ denotes the color histogram of a current image for the histogram bin j. Here, $R_j$ is defined as a smaller value between the quotient obtained by dividing $M_j$ by $I_j$ and 1.

Next, R_h is calculated for the color of all pixels (x, y), which is expressed as b_x, y=R_h (C(x, y)) (step 2132). Next, convolution is performed between the value of b calculated in step 2132 and the disk $D^r$, which is expressed as b=$D^r$*b, where $$D^r(x, y) = \begin{cases} 1 & \text{if } \sqrt{x^2 + y^2} \\ 0 & \text{otherwise.} \end{cases}$$

After the convolution, a coordinate having the largest result b of the convolution is found and defined as the initial position of the object (step 2134). Here, the defined initial position of the object is expressed as $(x_t, y_t)$=loc(max(x,y)b).

Figure 5:
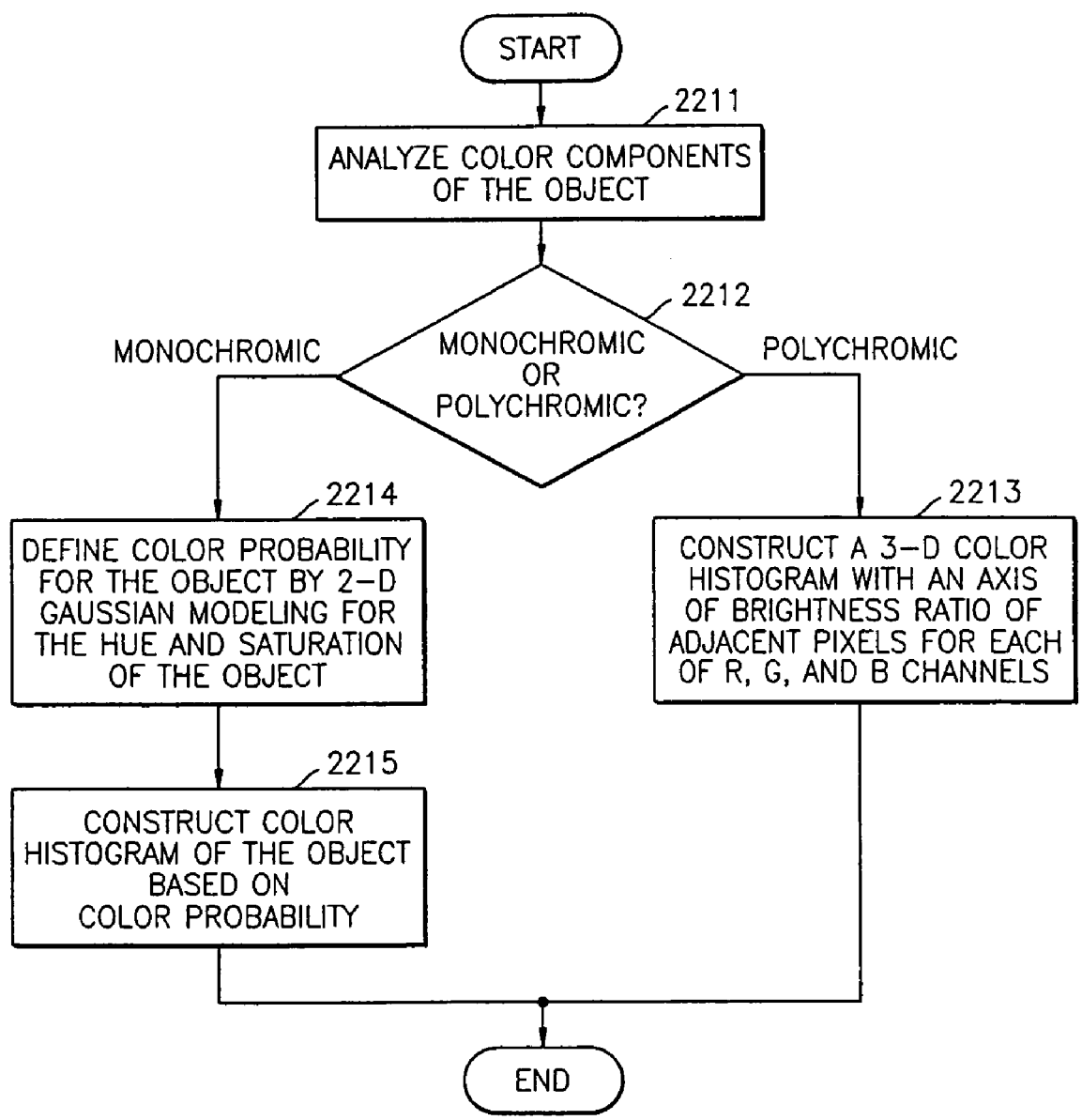
FIG. 5 is a flowchart of a step of modelling color information of the tracked object in FIG. 1.

The color information modelling of the tracked object in step 220 of FIG. 1 will be described in detail below. FIG. 5 is a flowchart of the color information modelling of step 220 on the tracked object in FIG. 1. Referring to FIG. 5, the color components of the tracked object are analysed (step 2211), and it is determined whether the object is monochromatic or polychromatic based on the result of the analysis using equation 1 below (step 2212):

$$\frac{1}{S}\sum_{i,j}\{(R(i,j)-u_R)^2 + (G(i,j)-u_G)^2 + (B(i,j)-u_B)^2\} < Th \quad (1)$$

where S indicates the number of (i,j) pairs, $u_R$ indicates an average value of red (R) image data of the (i,j) pairs, $u_G$ indicates an average value of green (G) image data of the (i,j) pairs, $u_B$ indicates an average value of blue (B) image data of the (i,j) pairs, and Th is a threshold. If the left side of equation 1 is smaller than the threshold Th, the object is determined to be monochromic. If the left side of equation 1 is greater than or equal to the threshold Th, the object is determined to be polychromic.

When the object is determined to be polychromic, the color information of the object is stored as a 3-D histogram $h_{object}$(color) having an axis of brightness ratio of adjacent pixels for each of three R, G, and B channels (step 2213). By using the 3-D histogram $h_{object}$(color) of the color ratio, tracking the object can be performed unaffected by illumination variations.

When the target object to be tracked is determined to be monochromic, such as a person's facial image, the main feature of the object cannot be expressed by the color ratio. In other words, the histogram $h_{object}$(color) of the color ratio is ineffective for recognizing and tracking a monochromic object. According to the present invention, a color probability is defined for a monochromic object by illumination-invariant 2-D Gaussian modelling for the hue and saturation of the object according to the overall image brightness (step 2214), and a color histogram of the object is constructed based on the defined color probability of the object (step 2215), which are described in detail below.

Figure 6:
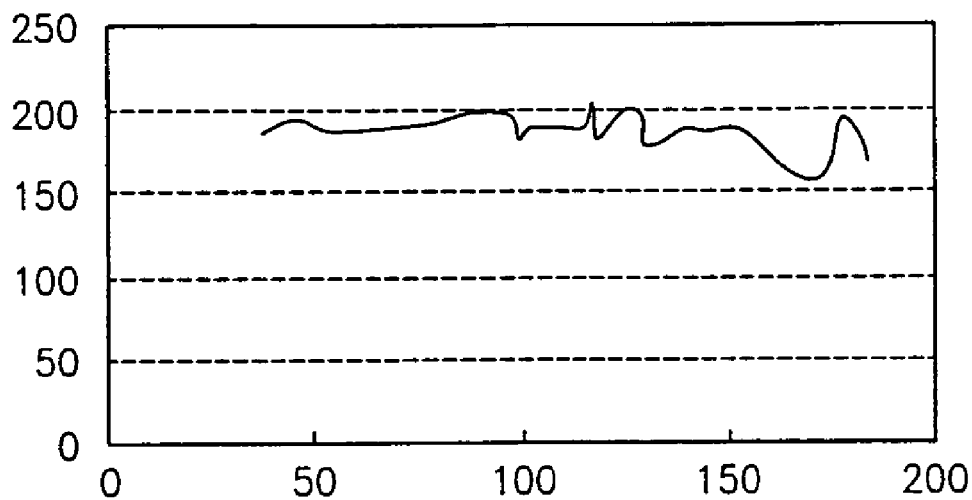
FIG. 6 shows variations in the hue and saturation of a monochromic facial object image of skin color with respect to illumination variations.
Figure 6:
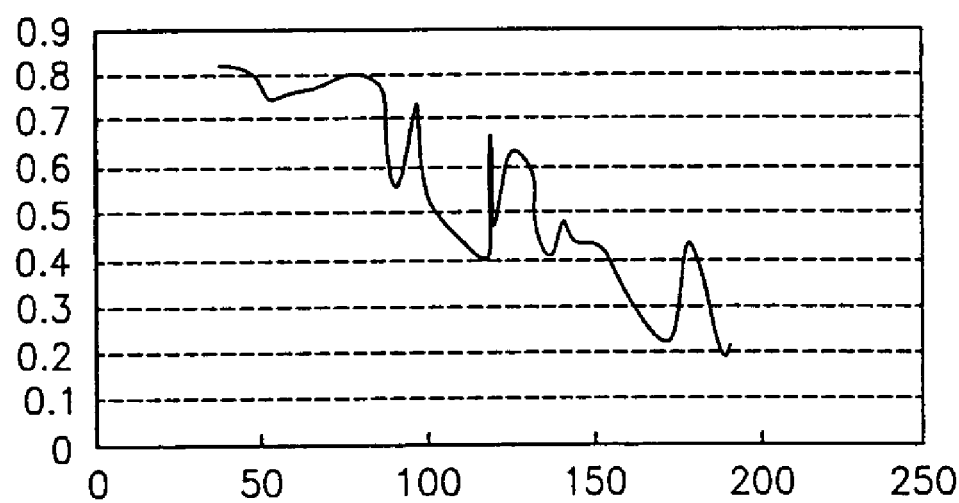

FIG. 6 shows variations in the hue and saturation of a monochromic object of skin color with respect to illumination variations. Referring to (a) and (b) of FIG. 6, the hue of the skin color in an HSI color space is invariant to the environmental brightness, and its saturation linearly decreases with increasing intensity of brightness. This feature of the monochrome is applied to other general colors as well as the skin color. Based on this feature, the color probability of the monochromic object of, for example, skin color, can be defined using equation 2 below:

$$P_{skin}(x, y) = \frac{\sum_{i=x-n/2}^{i=x+n/2} \sum_{j=x-n/2}^{j=x+n/2} g(Hue(i, j), Sat(i, k); \vec{u}, \Sigma)}{n^2} \quad (2)$$

where $$\vec{u} = \begin{bmatrix} 175 \\ -\frac{0.6}{150}I + 1.0 \end{bmatrix}, \Sigma = \begin{bmatrix} 30^2 & 0 \\ 0 & \sigma_{sat}^2 \end{bmatrix}, g(i, j; \vec{u}, \Sigma)$$

denotes the 2-D Gaussian function, n denotes a size of the object, and I denotes an average brightness intensity of the image. Once the color probability of the object is defined, the color histogram is constructed by using the axes of the histogram $h_{object}$(color).

To effectively track the object using its color distribution, information on the color distribution of the entire image as well as information on that of the object are required, as described above. Modelling of the color distribution information on the entire image is performed as follows.

Figure 7:
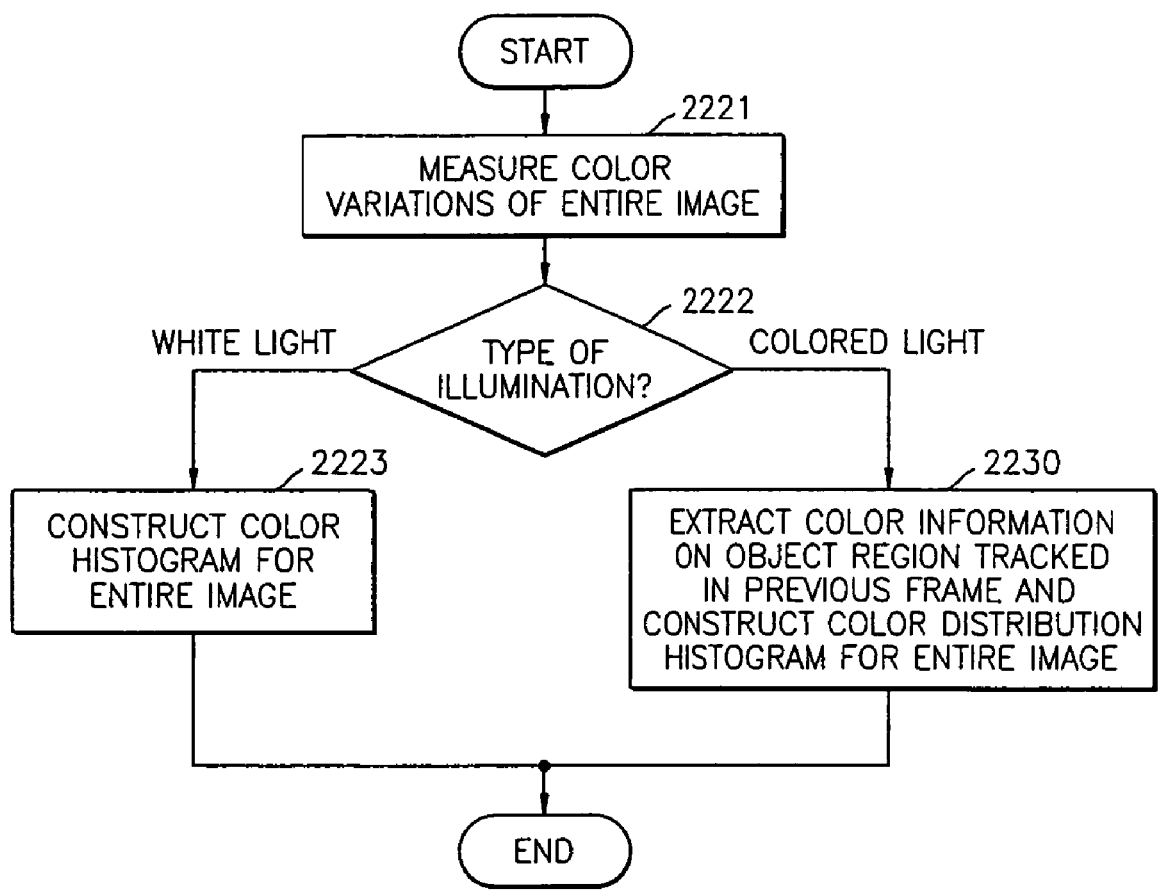
FIG. 7 is a flowchart of a step of modelling color information of the entire image in FIG. 1.

FIG. 7 is a flowchart of the color information modelling of the entire image in step 225 of FIG. 1. Referring to FIG. 7, color variations of the entire image are measured (step 2221), and it is determined based on the result of the color variation measurement whether the illumination is white light or colored light (step 2222) using equation 3:

$$\frac{1}{S} \sum_{i,j} \left\{ \left( \frac{R_n}{R_n + G_n + B_n} - \frac{R_m}{R_m + G_m + B_m} \right)^2 \right. \quad (3)$$

$$\left. \left( \frac{G_n}{R_n + G_n + B_n} - \frac{G_m}{R_m + G_m + B_m} \right)^2 \right\} \geq Th$$

where S indicates the number of (i,j) pairs, n indicates a current frame image, m indicates a previous frame image, R, G, and B indicate red, green, and blue data of the image, respectively, and Th is a threshold. If the left side of equation 3 is smaller than the threshold Th, the illumination is determined to correspond to white light. If the left side of equation 3 is greater than or equal to the threshold Th, the illumination is determined to correspond to colored light.

If the illumination is determined to correspond to colored light in step 2222, a color distribution of an object region tracked in the previous frame is extracted to remodel color information on the object and to perform an adaptive color modelling to construct a color distribution histogram of the entire image (step 2230). Here, a technique used for the adaptive color modelling is identical to the color modelling method described with reference to FIG. 5. If the illumination is determined to correspond to white light, the color distribution of the entire image is constructed as a histogram $h_{total}$(color) for the identical axis to the axis of the object histogram constructed as described with reference to FIG. 5, not via the remodelling of the color information (step 2223).

In particular, as the result of measuring the color variation of the entire image, when the brightness of the entire image varies or a part of the image is illuminated by white light, the result of the color information modelling in step 220 of FIG. 1 is used. When the image is illuminated by colored lights of different wavelength intensities, the color information is adaptively modelled as in step 2230.

Next, referring back to FIG. 1, the probability map is constructed in step 240 in consideration of the position information of the object designated in step 210 and the color information modelled in steps 220 and 225. The constructed probability map is expressed as equations 4 and 5 below:

$$P(\text{object} | \text{color}) = h_{ratio}(\text{color}) = \frac{h_{object}(\text{color})}{h_{total}(\text{color})} \quad (4)$$

$$P_{object}(i, j) = P(\text{object} | \text{color}(i, j)) \quad (5)$$

In step 260, Kalman filtering is performed using the probability map of equations 4 and 5 above to track the object.

A Kalman filter continuously track the position and size of the target object in a moving picture by using equation 6 below:

$$\vec{u} = \begin{bmatrix} u_i \\ u_j \end{bmatrix} \quad (6)$$

$$C(i, j) = \begin{bmatrix} \sigma_i^2 & \sigma_{ij} \\ \sigma_{ij} & \sigma_i^2 \end{bmatrix}$$

where $\vec{u}$ indicates the center coordinate of the object, and C(i, j) indicates a covariance matrix. The constituent parameters of the center coordinate $\vec{u}$ of the object and the covariance matrix C(i, j) have the following values:

$$u_i = \frac{1}{S}\sum_{i,j} P_{object}(i, j) \cdot i \cdot g(i, j, \vec{u}, C)$$

$$u_j = \frac{1}{S}\sum_{i,j} P_{object}(i, j) \cdot j \cdot g(i, j, \vec{u}, C)$$

$$\sigma_i^2 = \frac{1}{S}\sum_{i,j} P_{object}(i, j) \cdot (i - u_i)^2 \cdot g(i, j, \vec{u}, C)$$

$$\sigma_i^2 = \frac{1}{S}\sum_{i,j} P_{object}(i, j) \cdot (j - u_i)^2 \cdot g(i, j, \vec{u}, C)$$

$$\sigma_{i,j}^2 = \frac{1}{S}\sum_{i,j} P_{object}(i, j) \cdot (i - u_i) \cdot (j - u_i) \cdot g(i, j, \vec{u}, C)$$

In step 260 of Kalman filtering, the current moving velocity of the object is predicted using the currently calculated position of the object and the previous data stored in a predetermined data region, and the covariance matrix is updated using equation 7 below to reliably track abrupt moving or stopping of the object:

$$C_{\pm w}(i, j) = \begin{bmatrix} 2(\sigma_i^2 + \Delta u_i^2) & \sigma_{i,j} \\ \sigma_{i,j} & 2(\sigma_i^2 + \Delta u_j^2) \end{bmatrix} \quad (7)$$

Once a predetermined object is tracked by a series of object tracking methods described above, the tracked object is edited through mosaic filtering (step 300) and displayed (step 400).

Figure 8:
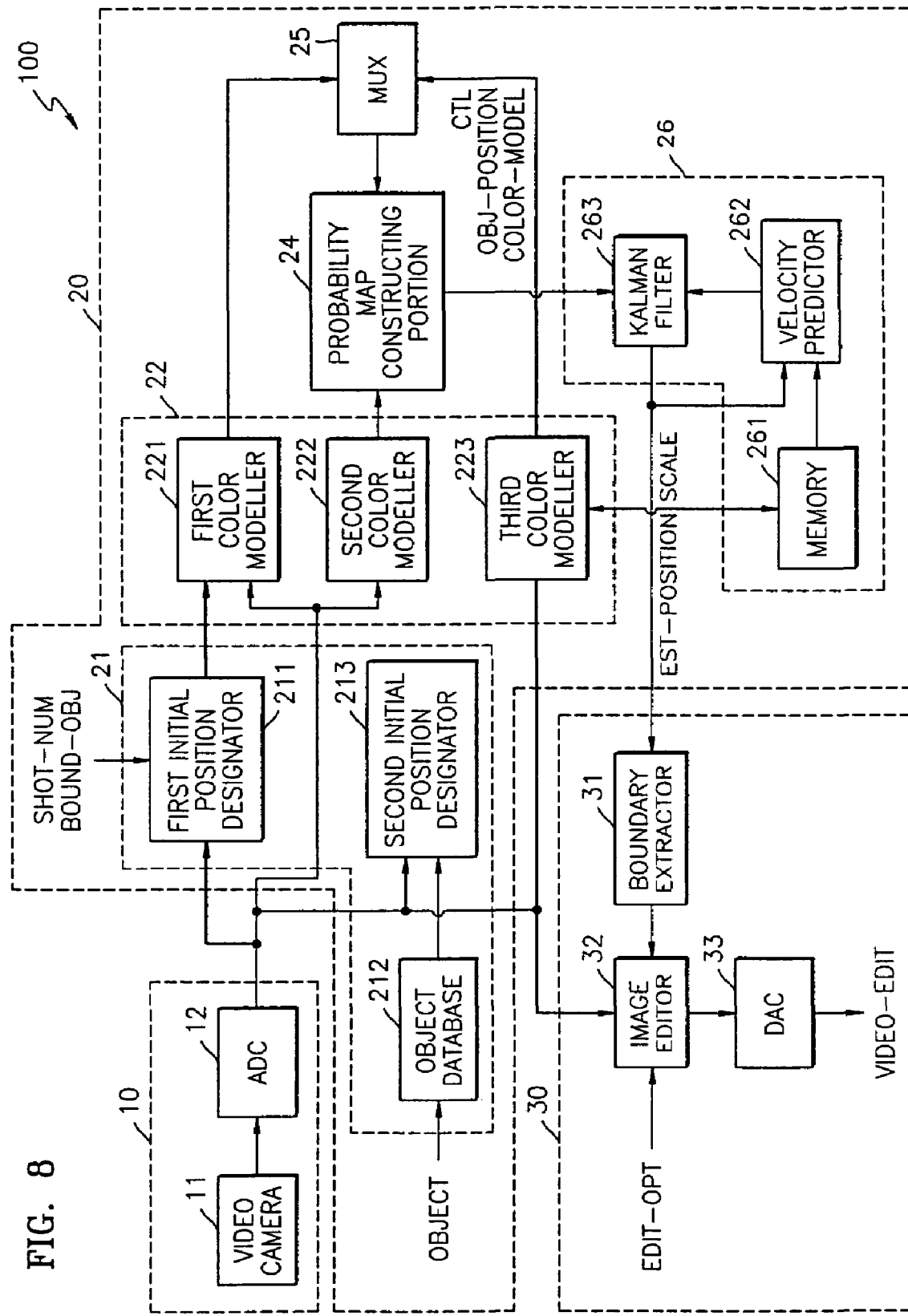
FIG. 8 is a block diagram of an image editing system according to an embodiment of the present invention.

FIG. 8 is a block diagram of an image editing system 100 according to a preferred embodiment of the present invention. The image editing system 100 includes a data input unit 10 which receives an image to be edited, an object tracking unit 20 which tracks an object in consideration of a color ratio of adjacent pixels of the input image, and an image editing unit 30 which edits and outputs an edited image in a predetermined region of the image, in response to information on the position, size, and boundary of the tracked object.

The data input unit 10 includes a video camera 11 which receives an analog image signal and an analog-to-digital converter (ADC) 12.

The object tracking unit 20 includes an initial position designating portion 21 which designates an initial position of the object to be tracked in the image, a color modelling portion 22 which performs a color modelling on the object and the entire image in consideration of the color ratio of the adjacent pixels, a probability map constructing portion 24 which constructs the probability map for tracking the object based on the result of the color modelling, a multiplexer (MUX) 25 which selects the input for the map probability constituting portion 24, and an object tracking portion 26 which tracks a current position of the object in response to the initial position and the probability map.

The initial position designating portion 21 includes a first initial position designator which receives a predetermined position designated by a user as the initial position of the object, an object database 212 which stores a list of objects and color modelling data for the objects, and a second initial position designator which reads the color modelling data for a target object designated by the user from the object database 212 and automatically designates the initial position of the target object by back-projecting the read color modelling data. The first initial position designator 211 manually designates the initial position of the object, and the second initial position designator 213 automatically designates the initial position of the object, as described above.

The color modelling portion 11 includes a first color modeler 221 which models the color information on the object, a second color modeler 222 which models the color information on the entire image, and a third color modeler 223 which adaptively models the color information on the object based on the illumination variation of the image.

When the initial position of the object to be edited is manually or automatically designated by the first or second initial position designator 211 or 213, the first color modeler 221 extracts color information from the initial position of the object to use the color information when tracking the object. The first color modeler 221 determines whether the object is monochromic or polychromic. If the target object is determined to be polychromic, the color information of the object is determined as a 3-D histogram $h_{object}$(color) having an axis of the color ratio of adjacent pixels for each of the R, G, and B channels. By using the 3-D histogram $h_{object}$(color) of the color ratio, the object can be recognized unaffected by illumination variations.

If the target object is determined to be monochromic, such as a person's facial image, the main feature of the object cannot be expressed by the color ratio, and thus recognizing and tracking the object using the color ratio is ineffective. Accordingly, in the present invention, 2-D Gaussian modelling of hue and saturation according to the image brightness is performed on the monochromic object for illumination-invariant object color modelling.

In general, when a target object to be tracked or recognized is non-rigid or has a great rotation, using color information, rather shape information, is advantageous in terms of time consumption and accuracy. However, a video signal for broadcasting includes serious illumination variations because it is imaged indoors and outdoors. Accordingly, the color of a target object greatly varies in a general RGB color space, and thus it is difficult to track and recognize the target object using the general color information. According to the present invention, for illumination-invariant object tracking, both of the results of color modelling performed by the first color modeler 221 and the third color modeler 223 are used to extract the color information of the object.

To this end, the third color modeler 223 measures color variations of the entire image. When the image is determined to be illuminated by colored lights as the result of the color variation measurement, color modelling of an object tracked in the previous frame of the image is re-performed, and a color distribution of the entire image is constructed as a histogram. When the image is determined to be illuminated by white light as the result of the color variation measurement, the result of color-modelling the object performed in the first color modeler 221 is used.

To effectively track an object using its color distribution, color distribution information of the entire image as well as that of the object are required, as described above. To this end, the second color modeler 222 constructs the color distribution of the entire current image as a histogram $h_{total}$(color) having the identical axes as those of the object histogram.

The probability map constructing portion 24 receives the result of the color modelling performed by the second color modeler 222 and via the MUX 25 the position of the selected object and the result of the color modelling performed by the first or third color modeler 221 or 223. The probability map of equations 4 and 5 above are constructed by the probability map constructing portion 24.

The object database 212 stores the illumination-invariant color histogram formed by the first color modeler 221, for example, the color ratio-based histogram or an illumination-based Gaussian histogram according to the color components of the object. The color distribution information of the object stored in the object database 212 is used to automatically designate the initial position of the object by the second initial position designator 213 when the user selects the target object of interest from the list of objects.

The object tracking portion 26 includes a memory 261, a velocity predictor 262, and a Kalman filter 263 and tracks the current position of the object. The Kalman filter 263 receives the object's probability map (COLOR-MODEL) constructed by the probability map constructing portion 24 and the initial position of the object (OBJ_POSITION) and continuously tracks the position and size of the object of interest in a series of pictures using equation 6 above. The velocity predictor 262 stores the previous position of the object in the memory 261 and predicts the moving velocity of the object using both current and previous position data of the object. The velocity predictor 262 updates the covariance matrix of the Kalman filter 263 using equation 7 above to reliably track abrupt moving or stopping of the object:

After a predetermined object is tracked by the series of object tracking techniques described above, the tracked object is automatically edited through mosaic filtering, by the image editing unit 30. To provide greatly diversified editing functions, the image editing unit 30 includes a boundary extractor 31 as well as an image editor 32 which edits an image, and a DAC 33 which converts and outputs an edited video signal to an analog signal. The boundary extractor 31 provides information on the boundary of the object being tracked in connection with the image editor 32. In particular, an object region is defined as a binary image using both a quantized color image and a motion difference image, and the boundary of the object is extracted using a boundary following algorithm.

According to the present invention, the image editing unit 30 includes a previously stored list of editing functions (not shown). When the user selects a particular editing function, an editing algorithm is operated according to the result of the selection, and the result of the edition is converted into analog form via the DAC 33. The editing algorithm performed by the image editor 32 colors a particular region of each digital image using the information on the position, size, or boundary (or contour) of the object of interest or passes the particular region through a predetermined filter to edit the image. Suitable filters for the edition includes a mosaic filter, a blurring filter, an inverse filter, etc.

When the image editing system 100 according to the present invention as described above is applied to a real image, the results are as follows.

Figure 9:
FIG. 9 shows synthetic Mondrian images illuminated in different lighting conditions.
Figure 9:
Figure 9:

FIG. 9 shows synthetic Mondrian images illuminated in different lighting conditions. Referring to FIG. 9, (a) shows a synthetic Mondrian image in spatially and spectrally constant illumination, (b) shows a synthetic Mondrian image in spatially constant but spectrally varying illumination, and (c) shows a synthetic Mondrian image in spatially and spectrally varying illumination.

The synthetic Mondrian images (a), (b), and (c) are compared with one another in terms of RBG space, opponent color space, normalized RG space, HSI space, and color ratio space. The results are shown in Tables 1 through 3 below.

TABLE 1

Spatially and spectrally constant illumination

| | Rank 1 | Rank 2 | Rank 3 | Over Rank 3 | Average percentile | Average allowable error |
|---|---|---|---|---|---|---|
| RGB | 0 | 1 | 2 | 7 | 0.9103 | 0.00743 |
| Opponent | 0 | 2 | 1 | 7 | 0.9137 | 0.00743 |
| Normalized RG | 10 | 0 | 0 | 0 | 1.0000 | 0.32822 |
| HSI | 10 | 0 | 0 | 0 | 1.0000 | 0.30781 |
| Color ratio | 10 | 0 | 0 | 0 | 1.0000 | 0.58229 |

TABLE 2

Spatially constant but spectrally varying illumination

| | Rank 1 | Rank 2 | Rank 3 | Over Rank 3 | Average percentile | Average allowable error |
|---|---|---|---|---|---|---|
| RGB | 4 | 2 | 0 | 4 | 0.9517 | 0.06932 |
| Opponent | 5 | 0 | 1 | 4 | 0.9517 | 0.06932 |
| Normalized RG | 4 | 1 | 3 | 2 | 0.9551 | 0.06038 |
| HIS | 5 | 1 | 3 | 1 | 0.9655 | 0.06157 |
| Color ratio | 10 | 0 | 0 | 0 | 1.0000 | 0.58229 |

TABLE 3

Spatially and spectrally varying illumination

| | Rank 1 | Rank 2 | Rank 3 | Over Rank 3 | Average percentile | Average allowable error |
|---|---|---|---|---|---|---|
| RGB | 3 | 2 | 0 | 5 | 0.9413 | 0.0298 |
| Opponent | 5 | 2 | 0 | 3 | 0.9620 | 0.0321 |
| Normalized RG | 5 | 2 | 3 | 0 | 0.9724 | 0.0214 |
| HIS | 6 | 1 | 2 | 1 | 0.9724 | 0.0233 |
| Color ratio | 10 | 0 | 0 | 0 | 1.0000 | 0.3561 |

As shown in Tables 1 through 3, in the color ratio space, the synthetic Mondrian images showed a high average percentile of matching regardless of the illumination variations. Evidently, the object tracking method according to the present invention is illumination-invariant.

Figure 10:
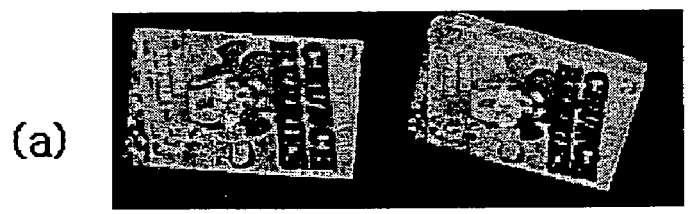
FIG. 10 shows examples of real images taken in different illumination conditions.
Figure 10:
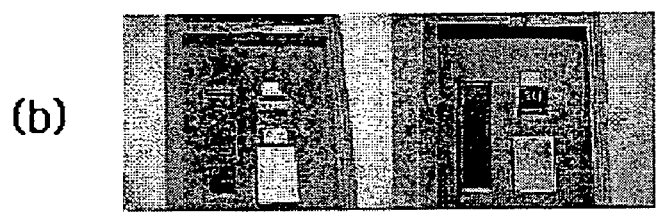
Figure 10:
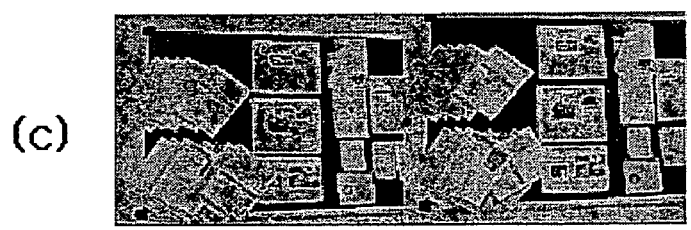

FIG. 10 shows examples of real images taken in different illumination conditions. Referring to FIG. 10, (a) shows a Swain's model where one image is tilted with respect to the other image, (b) shows two images taken in similar illumination conditions, and (c) shows two images taken in greatly different illumination conditions.

Those images in (a), (b), and (c) of FIG. 10 are compared with one another in terms of RBG space, opponent color space, normalized RG space, HSI space, and color ratio space. The results are shown in Tables 4 through 6 below.

TABLE 4

Swain's model

|  | Rank 1 | Rank 2 | Rank 3 | Over Rank 3 | Average percentile | Average allowable error |
|---|---|---|---|---|---|---|
| RGB | 29 | 0 | 0 | 0 | 1.0000 | 0.1518 |
| Opponent | 28 | 0 | 0 | 1 | 0.9964 | 0.1599 |
| Normalized RG | 27 | 1 | 0 | 1 | 0.9942 | 0.1344 |
| HIS | 25 | 3 | 0 | 1 | 0.9928 | 0.1387 |
| Color ratio | 29 | 0 | 0 | 0 | 1.0000 | 0.1012 |

TABLE 5

Similar illumination

|  | Rank 1 | Rank 2 | Rank 3 | Over Rank 3 | Average percentile | Average allowable error |
|---|---|---|---|---|---|---|
| Opponent | 23 | — | — | 1 | 0.994 | 0.255 |
| Normalized RG | 23 | 1 | — | — | 0.998 | 0.163 |
| HIS | 23 | — | 1 | — | 0.997 | 0.198 |
| Color ratio | 23 | — | 1 | — | 0.997 | 0.044 |

TABLE 6

Large change of illumination

|  | Rank 1 | Rank 2 | Rank 3 | Over Rank 3 | Average percentile | Average allowable error |
|---|---|---|---|---|---|---|
| Opponent | 9 | 1 | 1 | 10 | 0.9476 | 0.072 |
| Normalized RG | 9 | — | 1 | 11 | 0.9444 | 0.058 |
| HIS | 8 | 1 | 3 | 9 | 0.9460 | 0.059 |
| Color ratio | 8 | 3 | 5 | 5 | 0.9554 | 0.048 |

As shown in Table 4, in the Swain's model where the two images are tilted one another, a high average percentile of matching resulted in the color ratio space. As shown in Tables 5 and 6, a high average percentile of matching was observed for the images in the color ratio space regardless of the degree of illumination variations. Evidently, the object tracking method according to the present invention is illumination-invariant.

Figure 11:
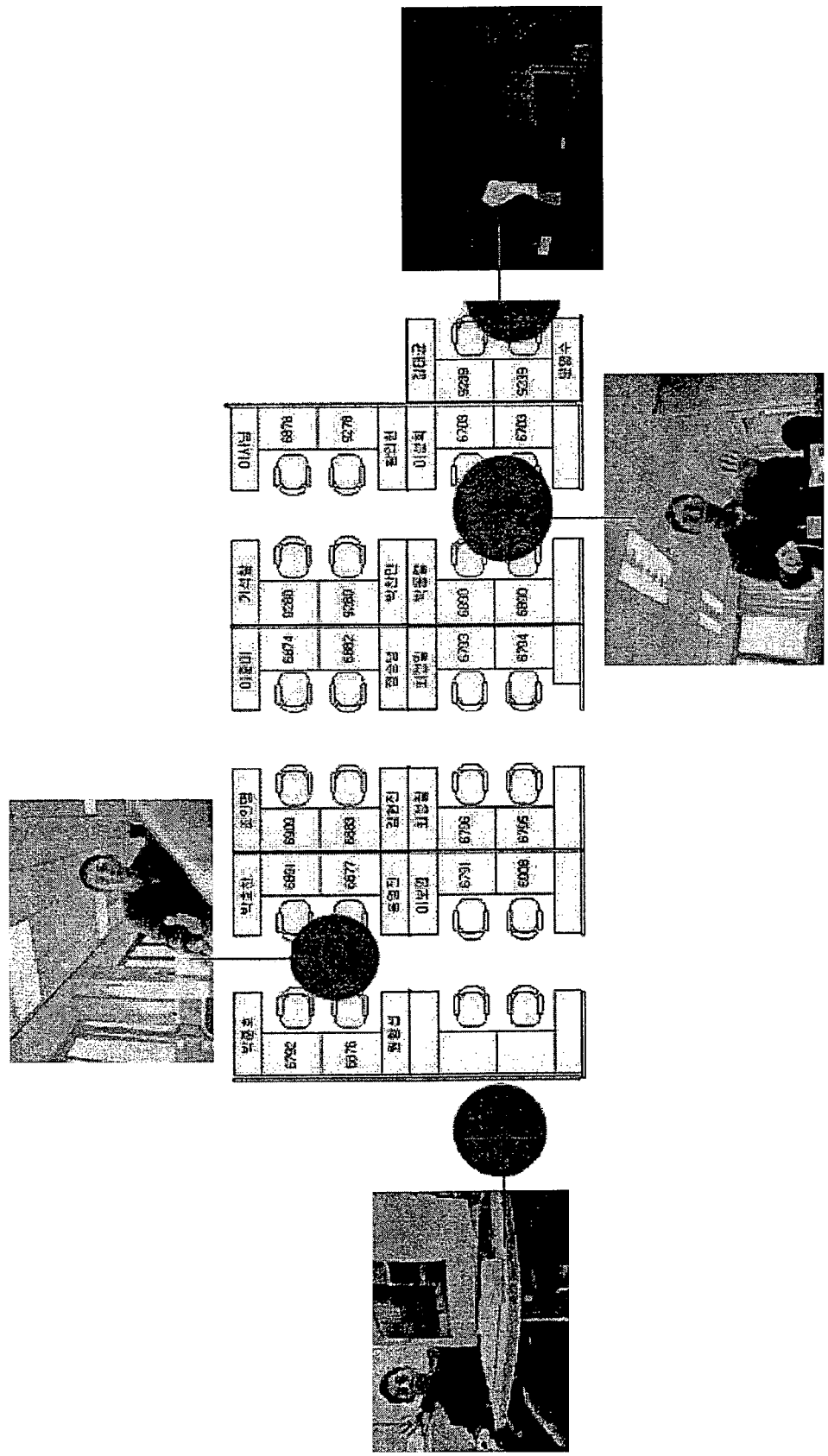
FIG. 11 shows an example of collecting data of skin color in different illumination conditions.

FIG. 11 shows an example of collecting data of skin color in different illumination conditions, in which selected images and the positions of the images in each frame are shown. As is apparent from FIG. 11, although the images are taken in the same office, the images have different brightnesses depending on the locations in the office where the images are taken. According to the present invention, the images are taken from different locations in the office for color modelling.

Figure 12:
FIG. 12 shows an example of the skin color data collected in FIG. 11.

FIG. 12 shows an example of the skin color data collected in FIG. 11. In FIG. 12, the skin color data collected from one of the images of FIG. 11 are illustrated in a graph on the right of FIG. 12.

Figure 13:
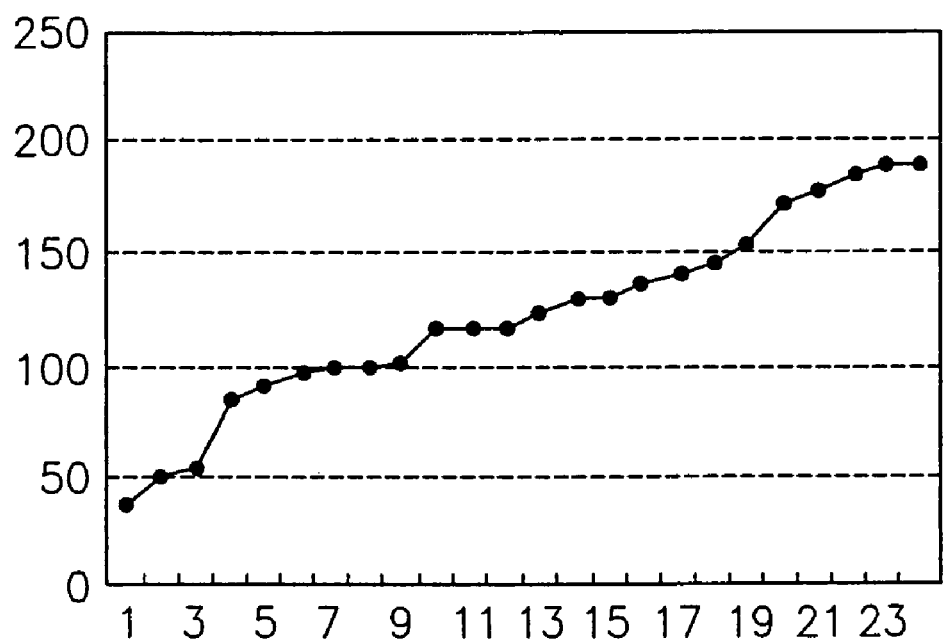
FIG. 13 is a graph of illumination variations for all the images collected in FIG. 11.

FIG. 13 is a graph of illumination variations for all the images collected in FIG. 11. As shown in FIG. 13, the illumination variations for all the images collected in FIG. 11 can be expressed as an HSI histogram. For example, when it is intended to track a facial image of a particular person in a moving picture, the object (someone's facial image) can be tracked based on the data collected and analyzed by the methods illustrated in FIGS. 11 through 13.

Figure 14:
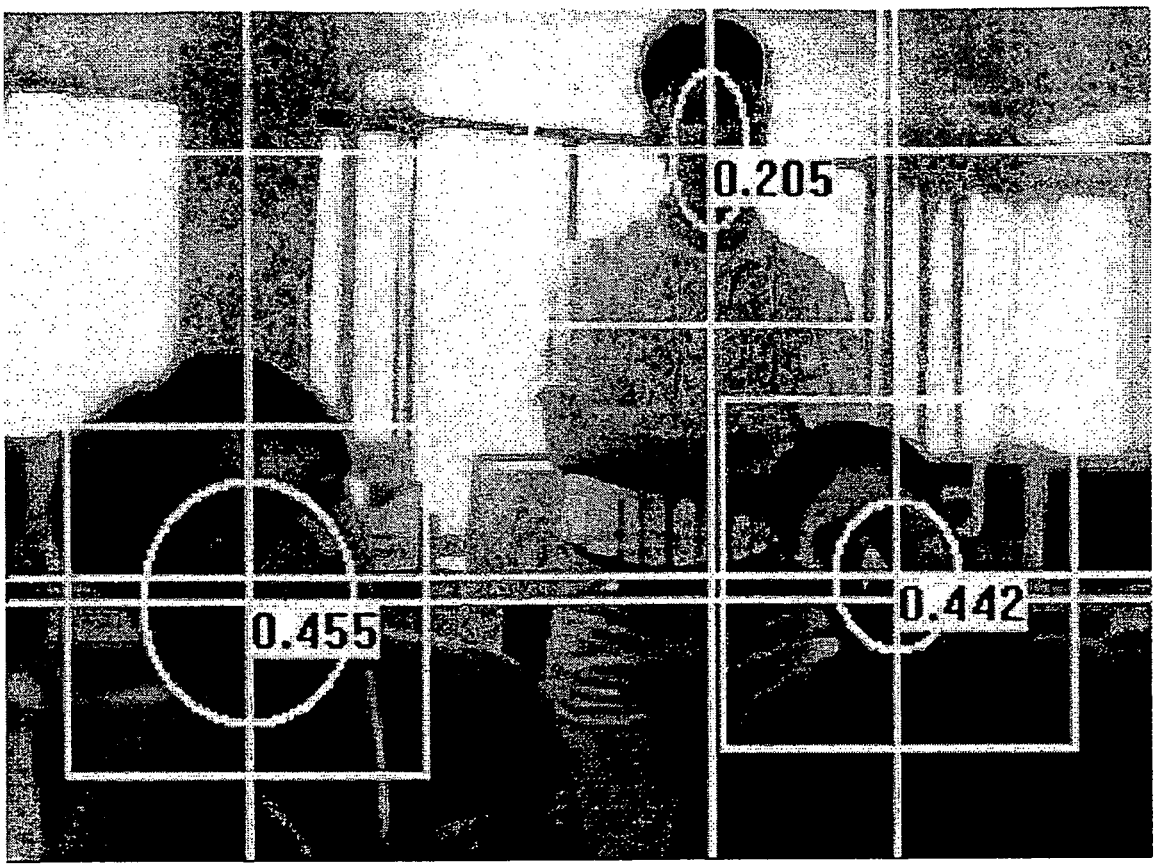
FIG. 14 shows the result of tracking a plurality of facial images based on the data obtained by the methods illustrated in FIGS. 11 through 13.
Figure 15:
FIG. 15 shows the result of processing facial images of particular persons as mosaics by the image editing system according to the present invention.

FIG. 14 shows the result of tracking a plurality of facial images based on the data obtained by the methods illustrated in FIGS. 11 through 13. FIG. 15 shows the result of processing facial images of particular persons as mosaics by the image editing system according to the present invention.

As shown in FIGS. 14 and 15, according to the object tracking method of the present invention, one or a plurality of particular objects can be accurately tracked although they have great illumination variations, and the tracked objects can be accurately edited, for example, through mosaic filtering.

As described above, in the illumination-invariant object tracking method and the image editing system using the object tracking method according to the present invention, when there is a need to edit an image data region of a moving picture imaged in greatly varying illumination conditions during a real-time broadcast or scheduled recording, the desired image data region can be accurately and reliably tracked and edited regardless of the illumination variations.

As described above, although in the above embodiments of the present invention the automatic object tracking and edition for a picture data have been described in greater detail, the present invention can be applied to the image edition by any imaging apparatus for broadcasting and home use or by a security system and to video chatting and communications.

While this invention has been particularly shown and described with reference to preferred embodiments thereof, it will be understood by those skilled in the art that various changes in form and details may be made therein without departing from the spirit and scope of the invention as defined by the appended claims.

The invention may be embodied as a computer readable program code in a computer readable recording medium, including but not limited to storage media such as magnetic storage media (e.g., ROMs, RAMs, magnetic tapes, floppy disks, hard disks, etc.), optically readable media (e.g., CD-ROMs, DVDs, etc.) and carrier waves (e.g., transmissions over the Internet). The computer readable program code may be stored to be executed in a plurality of dispersed computer systems connected via a network.

What is claimed is:

1. An image editing method comprising:
   (a) receiving an image to be edited;
   (b) tracking an object of interest in consideration of a color ratio of adjacent pixels in the image; and
   (c) editing and outputting an edited image in a predetermined region of the image in response to information on the position, size, and boundary of the tracked object.

2. The image editing method of claim 1, wherein (b) tracking the object of interest comprises:
   (b-1) designating an initial position of the object to be tracked in the image;
   (b-2) modelling color information on the object;
   (b-3) modelling color information on the entire object;
   (b-4) constructing a probability map based on the position of the object and the results of the color information modelling from (b-2) and (b-3); and
   (b-5) performing Kalman filtering based on the initial position and the probability map.

3. The image editing method of claim 2, wherein (b-1) designating the initial position of the object comprises:
   (b-1-1) determining whether to manually or automatically designate the initial position of the object;

(b-1-2) if it is determined in (b-1-1) to manually designate the initial position of the object, a user directly inputting the initial position of the object; and (b-1-3) if it is determined in (b-1-1) to automatically designate the initial position of the object, reading a color histogram of the object from a data storing unit where color histograms for a plurality of objects have been stored and automatically designating the initial position of the object by back-projecting the read color histogram.

4. The image editing method of claim 3, wherein denoting a disk having a radius r as Dr, (b-1-3) automatically designating the initial position of the object by back-projecting the read color histogram comprises:

(b-1-3-1) outputting a smaller value between the quotient of dividing the color histogram of a previous model for each histogram bin by the color histogram of a current image for each histogram bit and 1;

(b-1-3-2) performing the operation of (b-1-3-1) on all pixels in the mage;

(b-1-3-3) convolving the result of the operation of (b-1-3-2) with Dr; and (b-1-3-4) tracking a coordinate having the largest convolution result and designating the coordinate as the initial position of the object;

wherein $$D^r(x, y) = \begin{matrix} 1 & \text{if } \sqrt{x^2+y^2} \\ 0 & \text{otherwise.} \end{matrix}$$

where (x, y) denotes a coordinate in the image.

5. The image editing method of claim 2, wherein (b-2) modeling the color information on the object comprises:

(b-2-1) analyzing color components of the object;

(b-2-2) if the object is determined to be polychromatic as the result of the analysis (b-2-1), constructing a 3-dimensional histogram of the object with an axis of the brightness ratio for each of R, G, and B channels;

(b-2-3) if the object is determined to be monochromatic as the result of the analysis (b-2-1), defining a color probability for the object by 2-dimensional Gaussian modeling for the hue and saturation of the object; and (b-2-4) constructing a color histogram of the object with an axis of the color probability defined in (b-2-3).

6. The image editing method of claim 5, wherein in (b-2-1), a value of $$\frac{1}{S}\sum_{i,j}\{(R(i,j)-u_R)^2+(G(i,j)-u_G)^2+(B(i,j)-u_B)^2\},$$

where S indicates the number of (i,j) pairs, $u_R$ indicates an average value of red (R) image data of the (i,j) pairs, $u_G$ indicates an average value of green (G) image data of the (i,j) pairs, and $u_B$ indicates an average value of blue (B) image data of the (i,j) pairs, is calculated, the object is determined to be monochromic if the result of the calculation is smaller than a predetermined threshold, and the object is determined to be polychromatic if the result of the calculation is greater than or equal to the predetermined threshold.

7. The image editing method of claim 5, wherein in (b-2-3), the color probability is defined using the following equation:

$$P_{skin}(x,y) = \frac{\sum_{i=x-n/2}^{i=x+n/2}\sum_{j=x-n/2}^{j=x+n/2} g(Hue(i,j), Sat(i,k); \vec{u}, \sum)}{n^2}$$

where $$\vec{u} = \begin{bmatrix} 175 \\ -\frac{0.6}{150}I+1.0 \end{bmatrix}, \sum = \begin{bmatrix} 30^2 & 0 \\ 0 & \sigma_{sat}^2 \end{bmatrix}, g(i,j;\vec{u},\sum)$$

denotes a 2-dimensional Gaussian function, n denotes a size of the object, and I denotes an average brightness intensity of the image.

8. The image editing method of claim 2, wherein (b-3) modelling the color information on the entire image comprises:

(b-3-1) measuring color variations of the entire image;

(b-3-2) if the object is determined to be illuminated by white light as the result of (b-3-1), constructing a color distribution histogram of the entire image irrespective of the result of the object color information modelling in (b-2); and (b-3-3) if the object is determined to be illuminated by colored light as the result of (b-3-1), re-performing (b-2) on an object tracked in a previous image frame and constructing a color distribution histogram of the entire image.

9. The image editing method of claim 8, wherein in (b-3-1), a value of $$\frac{1}{S}\sum_{i,j}\left\{\left(\frac{R_n}{R_n+G_n+B_n}-\frac{R_m}{R_m+G_m+B_m}\right)^2\right.$$
$$\left.\left(\frac{G_n}{R_n+G_n+B_n}-\frac{G_m}{R_m+G_m+B_m}\right)^2\right\},$$

where S indicates the number of (i,j) pairs, n indicates a current frame image, m indicates a previous frame image, and R, G, and B indicate red, green, and blue data of the image, is calculated, the object is determined to be illuminated by the white light if the result of the calculation is smaller than a predetermined threshold, and the object is determined to be illuminated by the colored light if the result of the calculation is greater than or equal to the predetermined threshold.

10. The image editing method of claim 2, wherein the probability map is expressed as $$P(\text{object}|\text{color}) = h_{ratio}(\text{color}) = \frac{h_{object}(\text{color})}{h_{total}(\text{color})}$$

where $h_{object}$ (color) indicates the result of the color information modelling of the object and $h_{total}$ (color) indicates the result of the color information modelling of the entire image.

11. An image editing system comprising:
- a data input unit which receives an image to be edited;
- an object tracking unit which tracks a target object in consideration of a color ratio of adjacent pixels in the image; and
- an image editing unit which edits and outputs an edited image in a predetermined region of the image, in response to information on the position, size, and boundary of the tracked target object.

12. The image editing system of claim 11, wherein the object tracking unit comprises:
- an initial position designating portion which designates an initial position of the target object to be tracked in the image;
- a color modelling portion which performs a color modelling on the target object and the entire image in consideration of the color ratio of adjacent pixels in the image;
- a probability map constructing portion which constructs a probability map for object tracking based on the result of the color modelling; and
- a Kalman filter which tracks a current position of the target object in response to the initial position and the probability map.

13. The image editing system of claim 12, further comprising a data storage portion which stores a list of objects and color modelling data for the objects.

14. The image editing system of claim 12, wherein the initial position designating portion designates a predetermined position designated by a user as the initial position of the target object.

15. The image editing system of claim 13, wherein the initial position designating portion automatically designates the initial position of the target object by reading the color modelling data for the target object designated by the user from the data storage portion and back-projecting the read color modelling data.

16. The image editing system of claim 12, wherein the color modelling portion comprises:
- a first color modeler which models color information on the target object; and
- a second color modeler which models color information on the entire image.

17. The image editing system of claim 16, wherein the first color modeler analyzes color components of the target object, constructs a 3-dimensional histogram of the target object with an axis of the brightness ratio for each of R, G, and B channels if the target object is determined to be polychromatic as the result of the analysis, and defines a color probability for the target object by 2-dimensional Gaussian modeling for the hue and saturation of the target object and constructs a color histogram of the target object with an axis of the color probability if the target object is determined to be monochromatic as the result of the analysis.

18. The image editing system of claim 16, wherein the second color modeler calculates a value of $$\frac{1}{S}\sum_{i,j}\{(R(i,j)-u_R)^2+(G(i,j)-u_G)^2+(B(i,j)-u_B)^2\},$$

where S indicates the number of (i,j) pairs, $u_R$ indicates an average value of red (R) image data of the (i,j) pairs, $u_G$ indicates an average value of green (G) image data of the (i,j) pairs, and $u_B$ indicates an average value of blue (B) image data of the (i,j) pairs, determines the target object to be monochromic if the result of the calculation is smaller than a predetermined threshold, and determines the target object to be polychromatic if the result of the calculation is greater than or equal to the predetermined threshold.

19. The image editing system of claim 17, wherein the first color modeler defines the color probability of the target object using the following equation:

$$P_{skin}(x,y) = \frac{\sum_{i=x-n/2}^{i=x+n/2}\sum_{j=x-n/2}^{j=x+n/2}g(Hue(i,j),Sat(i,k);\vec{u},\sum)}{n^2}$$

where $$\vec{u} = \begin{bmatrix} 175 \\ -\frac{0.6}{150}I+1.0 \end{bmatrix}, \sum = \begin{bmatrix} 30^2 & 0 \\ 0 & \sigma_{sat}^2 \end{bmatrix}, g(i,j;\vec{u},\sum)$$

denotes a 2-dimensional Gaussian function, n denotes a size of the object, and I denotes an average brightness intensity of the image.

20. The image editing system of claim 12, wherein the color modelling portion further comprises a third color modeler which measures color variations of the entire image and re-performs the color modelling on an object tracked in a previous image and constructs a color distribution histogram of the entire image if the target object is determined to be illuminated by colored light as the result of the color variation measurement.

21. The image editing system of claim 20, wherein the third color modeler calculates a value of $$\frac{1}{S}\sum_{i,j}\left\{\left(\frac{R_n}{R_n+G_n+B_n}-\frac{R_m}{R_m+G_m+B_m}\right)^2\right.$$
$$\left.\left(\frac{G_n}{R_n+G_n+B_n}-\frac{G_m}{R_m+G_m+B_m}\right)^2\right\},$$

where S indicates the number of (i,j) pairs, n indicates a current frame image, m indicates a previous frame image, and R, G, and B indicate red, green, and blue data of the image, respectively, determines the target object to be illuminated by white light if the result of the calculation is smaller than a predetermined threshold, and determines the target object to be illuminated by the colored light if the result of the calculation is greater than or equal to the predetermined threshold.

22. The image editing system of claim 12, wherein the probability map constructing portion calculates the probability map as the following equation $$P(\text{object}|\text{color}) = h_{ratio}(\text{color}) = \frac{h_{object}(\text{color})}{h_{total}(\text{color})}$$

where $h_{object}$ (color) indicates the result of the color information modelling of the target object and $h_{total}$ (color) indicates the result of the color information modelling of the entire image.

23. The image editing system of claim 11, wherein the image editing unit comprises:

a boundary extractor which extracts boundary information of the target object tracked by the object tracking unit; and an image editor which filtering the target object at least one time using information on the extracted boundary information and position and size information of the target object.

24. The image editing system of claim 23, wherein the image editor comprises at least one filter selected from the group consisting of a mosaic filter, a blurring filter, and an inverse filter.

* * * * *